(12) United States Patent
Weber et al.

(10) Patent No.: US 8,898,099 B2
(45) Date of Patent: Nov. 25, 2014

(54) LIBRARY SYNCHRONIZATION BETWEEN DEFINITIONS AND INSTANCES

(71) Applicant: Rockwell Automation Technologies, Inc., Mayfield Heights, OH (US)

(72) Inventors: Jason Andrew Weber, Wauwatosa, WA (US); Gregory J. Shuler, Muskego, WI (US); Joseph T. Bronikowski, New Berlin, WI (US); Todd A. Vance, West Bend, WI (US); Jeffrey Foley, Muskego, WI (US); Russell W. Brandes, Brunswick, OH (US); Adam B. Maki, Claremont, NH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 13/917,863

(22) Filed: Jun. 14, 2013

(65) Prior Publication Data

US 2013/0282153 A1     Oct. 24, 2013

Related U.S. Application Data

(63) Continuation of application No. 13/540,372, filed on Jul. 2, 2012, now Pat. No. 8,489,535, which is a continuation of application No. 12/111,628, filed on Apr. 29, 2008, now Pat. No. 8,239,339.

(51) Int. Cl.
| | | |
|---|---|---|
| *G06N 5/02* | (2006.01) | |
| *G06F 9/44* | (2006.01) | |
| *G06N 5/00* | (2006.01) | |
| *G05B 15/02* | (2006.01) | |
| *G06N 5/04* | (2006.01) | |

(52) U.S. Cl.
CPC .. *G06F 8/71* (2013.01); *G06N 5/02* (2013.01); *G06N 5/04* (2013.01); *G06N 5/00* (2013.01); *G05B 15/02* (2013.01)

USPC .............................................. 706/47; 717/171

(58) Field of Classification Search
CPC ................... G06F 8/65–8/68; G06F 8/70–8/71
USPC .................................................... 717/168–178
See application file for complete search history.

(56) References Cited

U.S. PATENT DOCUMENTS 4,410,983 A    10/1983   Cope
4,558,413 A * 12/1985   Schmidt et al. ............... 717/170

(Continued)

FOREIGN PATENT DOCUMENTS

| WO | WO2004061540 A1 | 7/2004 |
|---|---|---|
| WO | WO2004086160 A1 | 10/2004 |

OTHER PUBLICATIONS

Tichy, Walter F. et al.; "RCS—A System for Version Control"; 1985; John Wiley & Sons, Ltd.; Software—Practice and Experience, vol. 15(7); pp. 637-654.*

(Continued)

*Primary Examiner* — Stanley K Hill
(74) *Attorney, Agent, or Firm* — Amin, Turocy & Watson, LLP

(57) ABSTRACT

In an industrial control configuration, various instances can exist that are based upon a definition. A definition can be changed and thus it can be appropriate to alter related instances in accordance with the change. However, changing an instance can cause disruption in other actions even when the change is minor. Therefore, various standards can be used to determine if a change to an instance should be propagated automatically or at another time, such as after an operation. The determination can be based on artificial intelligence techniques, user preference, a defined rule set, user instruction, as well as other standards.

20 Claims, 13 Drawing Sheets

(56) References Cited

U.S. PATENT DOCUMENTS

| | | | |
|---|---|---|---|
| 5,193,189 A | 3/1993 | Flood et al. | |
| 5,307,261 A | 4/1994 | Maki et al. | |
| 5,339,425 A | 8/1994 | Vanderah et al. | |
| 5,444,837 A | 8/1995 | Bomans et al. | |
| 5,576,946 A | 11/1996 | Bender et al. | |
| 5,636,124 A | 6/1997 | Rischar et al. | |
| 5,805,442 A | 9/1998 | Crater et al. | |
| 5,812,394 A | 9/1998 | Lewis et al. | |
| 5,918,233 A | 6/1999 | La Chance et al. | |
| 5,975,737 A | 11/1999 | Crater et al. | |
| 5,978,578 A | 11/1999 | Azarya et al. | |
| 5,982,362 A | 11/1999 | Crater et al. | |
| 6,161,051 A | 12/2000 | Hafemann et al. | |
| 6,201,996 B1 | 3/2001 | Crater et al. | |
| 6,237,004 B1 | 5/2001 | Dodson et al. | |
| 6,243,861 B1 | 6/2001 | Nitta et al. | |
| 6,282,455 B1 | 8/2001 | Engdahl | |
| 6,493,594 B1 | 12/2002 | Kraml | |
| 6,556,980 B1 | 4/2003 | Cheng | |
| 6,560,235 B1 | 5/2003 | Jones | |
| 6,684,264 B1 | 1/2004 | Choi | |
| 6,782,448 B2 | 8/2004 | Goodman et al. | |
| 6,801,920 B1 * | 10/2004 | Wischinski | 1/1 |
| 6,819,960 B1 | 11/2004 | McKelvey et al. | |
| 6,853,920 B2 | 2/2005 | Hsiung et al. | |
| 6,854,111 B1 | 2/2005 | Havner et al. | |
| 6,904,457 B2 | 6/2005 | Goodman | |
| 6,973,466 B2 | 12/2005 | Kaler et al. | |
| 6,985,779 B2 | 1/2006 | Hsiung et al. | |
| 7,069,201 B1 | 6/2006 | Lindner et al. | |
| 7,092,771 B2 | 8/2006 | Retlich et al. | |
| 7,130,704 B2 | 10/2006 | McKelvey et al. | |
| 7,222,131 B1 | 5/2007 | Grewal et al. | |
| 7,263,598 B2 | 8/2007 | Ambuel | |
| 7,596,615 B2 | 9/2009 | Satkunanathan et al. | |
| 2002/0046221 A1 | 4/2002 | Louis Wallace et al. | |
| 2002/0072928 A1 | 6/2002 | Sundararajan | |
| 2004/0030460 A1 | 2/2004 | Bergmann et al. | |
| 2008/0235357 A1 | 9/2008 | Gustafsson | |

OTHER PUBLICATIONS

Brennan, R.W. et al.; "Developments in dynamic and intelligent reconfiguration of industrial automation"; 2008; Elsevier; Computers in Industry 59 (2008); pp. 533-547.*

Dart, "Concepts in Configuration Management Systems"; 1991; Proceedings of the 3rd International Workshop on Software; pp. 1-18.

Westfechtel, et al., "A Leyered Architecture for Uniform Version Management"; 2001; IEEE Transactions on Software Engineering, vol. 27, No. 12; pp. 1111-1133.

Office Action dated Apr. 1, 2011 for U.S. Appl. No. 12/111,628, 22 pages.

Office Action dated Sep. 27, 2011 for U.S. Appl. No. 12/111,628, 18 pages.

Office Action dated Oct. 5, 2012 for U.S. Appl. No. 13/540,372, 22 pages.

* cited by examiner

LIBRARY SYNCHRONIZATION BETWEEN DEFINITIONS AND INSTANCES

CROSS-REFERENCE TO RELATED APPLICATIONS

This application is a continuation of U.S. application Ser. No. 13/540,372, filed on Jul. 2, 2012, entitled "LIBRARY SYNCHRONIZATION BETWEEN DEFINITIONS AND INSTANCES," which is a continuation of U.S. application Ser. No. 12/111,628, filed on Apr. 29, 2008, entitled "LIBRARY SYNCHRONIZATION BETWEEN DEFINITIONS AND INSTANCES," now U.S. Pat. No. 8,239,339, the entirety of which are incorporated herein by reference.

TECHNICAL FIELD

The subject specification relates generally to industrial controller libraries and in particular to propagation of a modified definition instance.

BACKGROUND

Industrial control environments can typically involve complex mechanical, electronic, electro-mechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation, for instance (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Different controls can be used to provide protective features in an industrial environment. If a user attempts to make a change upon the industrial environment, then various checks can take place to discover if a user is authorized to make the change, such as requesting the user to enter a username and password. In addition, the user can be provided various tools that can assist in making changes to the industrial environment, including providing a template to be used to make different modifications.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

In a conventional industrial control system, multiple units such as controllers, servers, and the like have access to definitions that relate to copies of lofical program code provided by a library. Various instances of the definition (e.g., instances of items characterized by definitions in a library) can be retained locally for faster operations, protection, isolation, and the like. When a change in a definition is made, related instances can automatically be modified to represent the new definition. However, problems can arise from automatic and absolute synchronization between definitions and instances. For example, changing a definition while an application is running can cause undesirable errors and ultimately cause an application to fail.

The disclosed innovation regulates synchronization between instances and definitions when a definition changes. A change can take place upon a definition (e.g., local definition, global and/or general definition, etc.) and a determination can be made when and/or if the change should be populated upon a related instance. The determination can be based upon artificial intelligence techniques, user preference, a defined rule set, user instruction, or a combination thereof.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
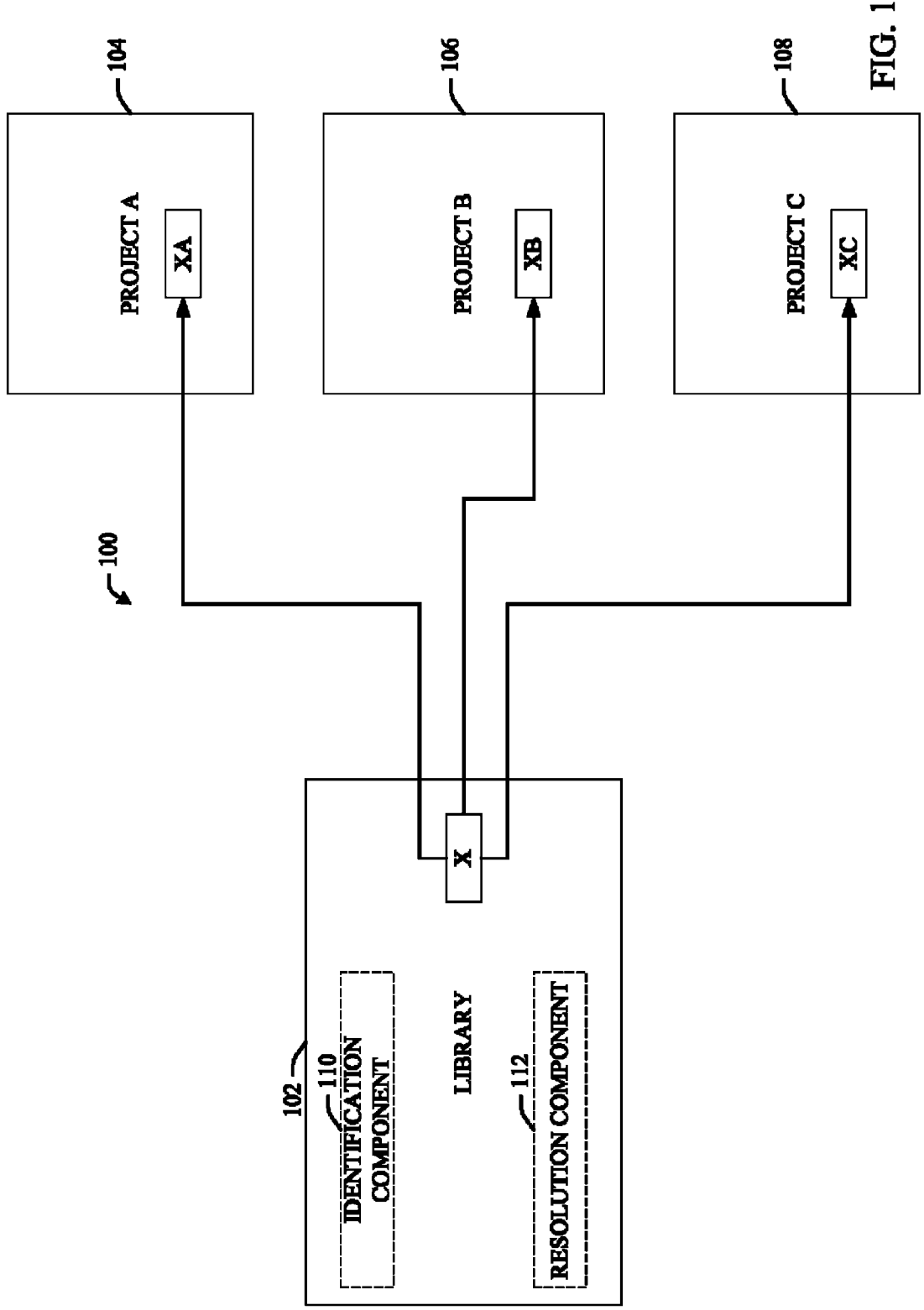
FIG. 1 illustrates a representative library and multiple project configuration in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through use of artificial intelligence techniques.

Now referring to FIG. 1, an example industrial control system 100 is disclosed that includes a library 102 and three projects 104, 106, and 108 (designated Project A, Project B, and Project C respectively). The library 102 can include a definition X that can be used by various entities that are part of the industrial control system 100 such as the projects 104, 106, and 108. For example, the definition X can propagate upon each of the projects once and thus creating XA, XB, and XC, which are instances of the definition X. Propagation can occur from a request generated by a project 104, 106, or 108 as well as an instruction from the library 102 or an auxiliary entity. The definition X can be considered a general definition, which can be a definition that multiple entities use. This can differ from a local definition which can be a definition used only upon one entity and commonly is based upon a general definition of another entity.

A change can take place upon the definition X, such as a user modifying a meaning of a term. An identification component 110 can recognize the change, commonly through passive observation, receiving an explicit notice that the change occurs, and the like. In conventional operation, the change does not propagate automatically and is performed manually, which can cause undesireable errors and become relatively time consuming for a user. A user can be running an important application on Project A while the change in the instance can be relatively minor—making the change on the instance can disrupt the application and cause the application to restart. Therefore, a user can desire for the propagation to take place after the application runs. A resolution component 112 can determine a manner in which the change should be implemented. For example, the resolution component 112 can notify the user of the proposed propagation and the user can specify a time the propagation should occur (e.g., a set time, after the application runs, not to propagate, etc.)

Figure 2:
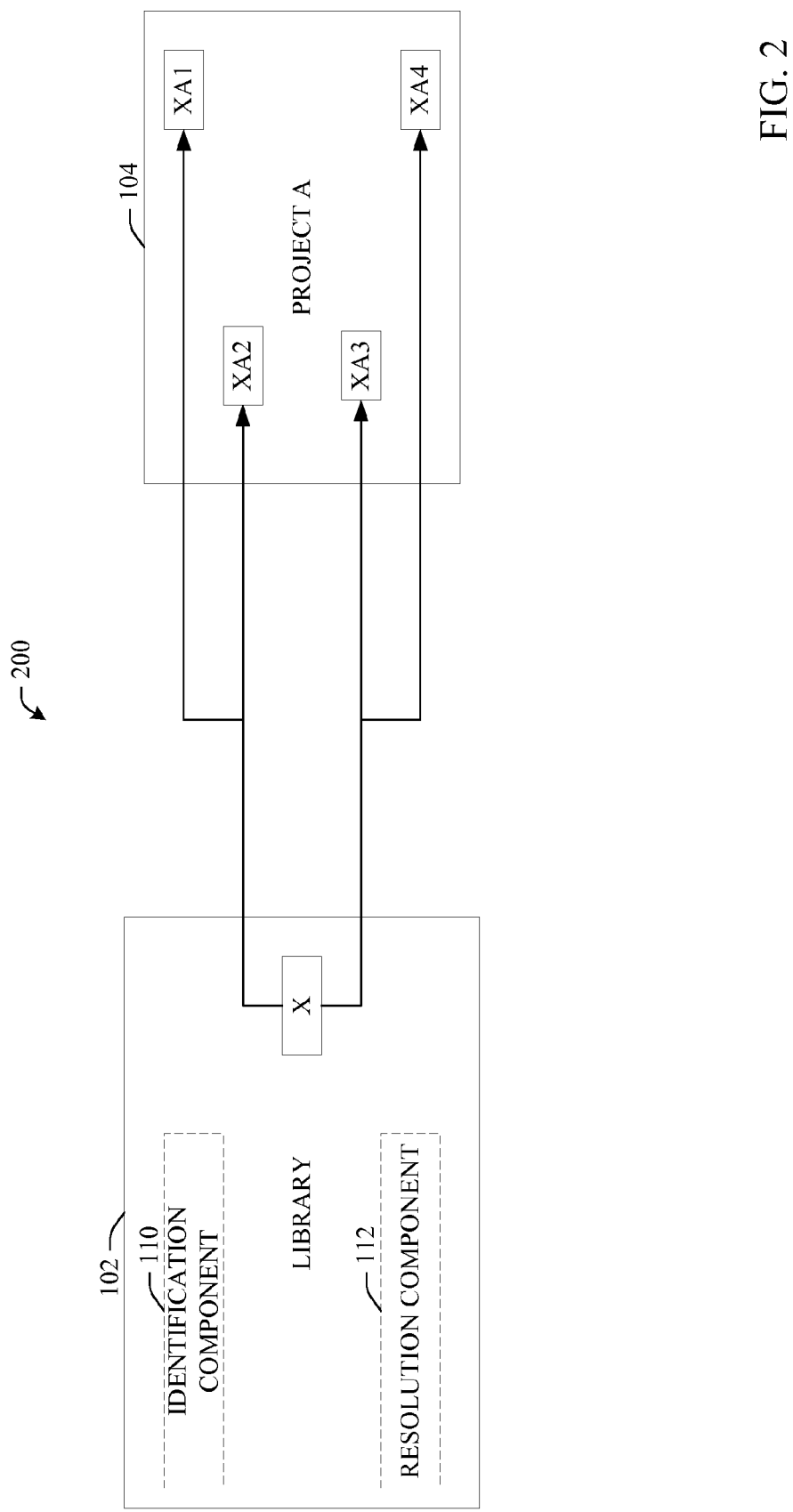
FIG. 2 illustrates a representative library and project configuration where a library definition is propagated upon a project in accordance with an aspect of the subject specification.

Now referring to FIG. 2, an example industrial control system 200 is disclosed. Project A 104 can have multiple instances XAn (e.g., n can be an integer 1, 2, 3, or 4) based upon definition X retained upon library 102. As a change takes place upon the definition, related instances can be modified to reflect the change. An identification component 110 can recognize a change in definition X and the resolution component 112 can determine a manner in which to propagate the change. In an illustrative example, the resolution component 112 can collect metadata related to operation of the system 100 and based upon a rule set, a determination can be made when propagation of each instance should take place. FIG. 2 can be considered a logical perspective of an industrial control system, such that the specific instances do not need to exist physically separate from one another. One type of instance can be a disconnected instance—instance of a component that is intentionally disconnected from the library 102 once instantiated. Thus, changes to the library 102 are not propagated to a disconnected instance, thereby protecting custom modifications to such disconnected instance. There can be a method for searching for and reconnecting such disconnected instances so they can be reset to a latest library definition. This searching and reconnecting can be initiated from, the library, the disconnected instance, a terminal, etc.

Figure 3:
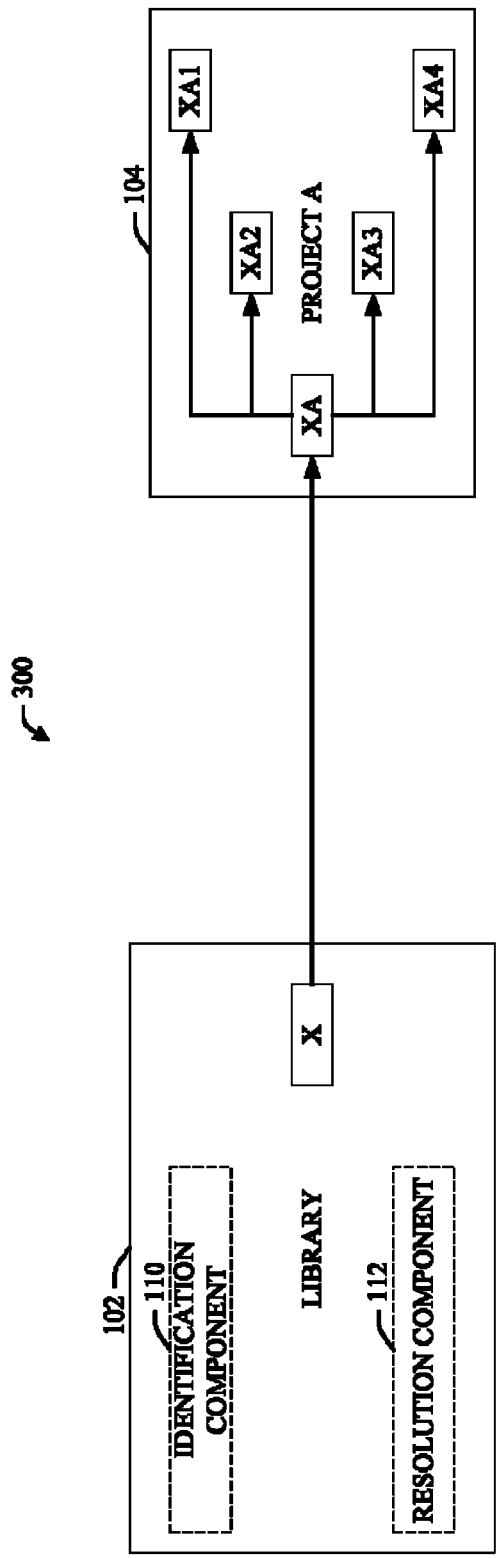
FIG. 3 illustrates a representative library and project configuration where a local definition is propagated upon a project in accordance with an aspect of the subject specification.

Now referring to FIG. 3, an example system 300 is disclosed where there are both a general definition X and a local definition XA. The definition X can propagate as an instance XA upon Project A 104; however, other instances can become dependent off the instance XA shown as instances XAn. Therefore, XA can operate as an instance of definition X and as well as be a local definition for instances XAn. An identification component 110 can recognize a suggested change in the definition X and a resolution component 112 can determine a manner in which the change should take place. The change can be a modification to the definition X, a propagation of the change upon the local definition XA, and/or propagation of the change upon at least one of the instances XAn—however, it is possible that propagation not be allowed.

While disclosed as residing upon the library 102, it is to be appreciated that the identification component 110 and/or resolution component 112 can reside upon other entities. For example, the identification component 110 can reside upon the library 102 while the resolution component 112 resides upon Project A 104. Additionally, these components as well as other components disclosed in the subject specification can reside upon a pluggable device that can be operatively coupled to the system 300.

Figure 4:
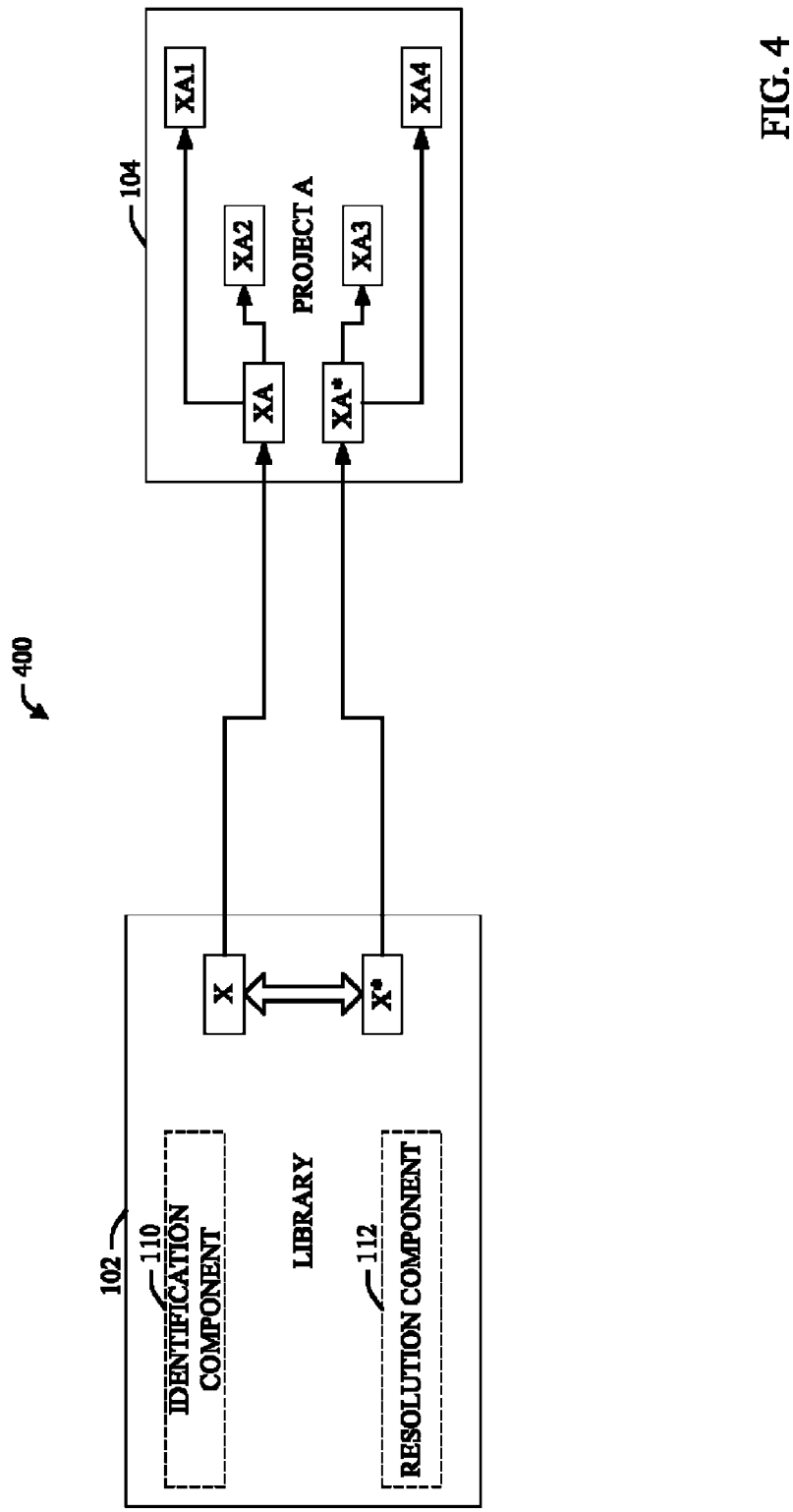
FIG. 4 illustrates a representative library and project configuration with multiple definitions in accordance with an aspect of the subject specification.

Now referring to FIG. 4, an example system 400 is disclosed for propagating a change upon a portion of instances. A library 102 can include a definition X that can be used as a basis for a local definition XA upon project A 104. However, the definition X can be requested to change to X*. An identification component 110 appreciates the suggested change and a resolution component 112 can determine whether a change should be implemented.

Project A 104 can receive a notice that there is a change to the definition X to X* (e.g., there are multiple revisions of one definition) and therefore instances of X should be changed to represent X*. Project A 104 can retain two versions of the definition X—XA and XA* where XA discloses X and XA* discloses X* A determination can be made by the resolution component 112 on what instances of XA should be immediately changed to XA* and which instances should wait. The determination for these instances can be based upon artificial intelligence techniques, user preference (e.g., a profile created for a user through artificial intelligence inferences), a defined rule set, user instruction, other techniques, or a combination thereof. For example, a user can instruct that XA3 and XA4 be immediately updated while XA1 and XA2 be updated in about one hour. Therefore, XA1 and XA2 retain the value of XA while XA3 and XA4 retain the value of XA*.

Figure 5:
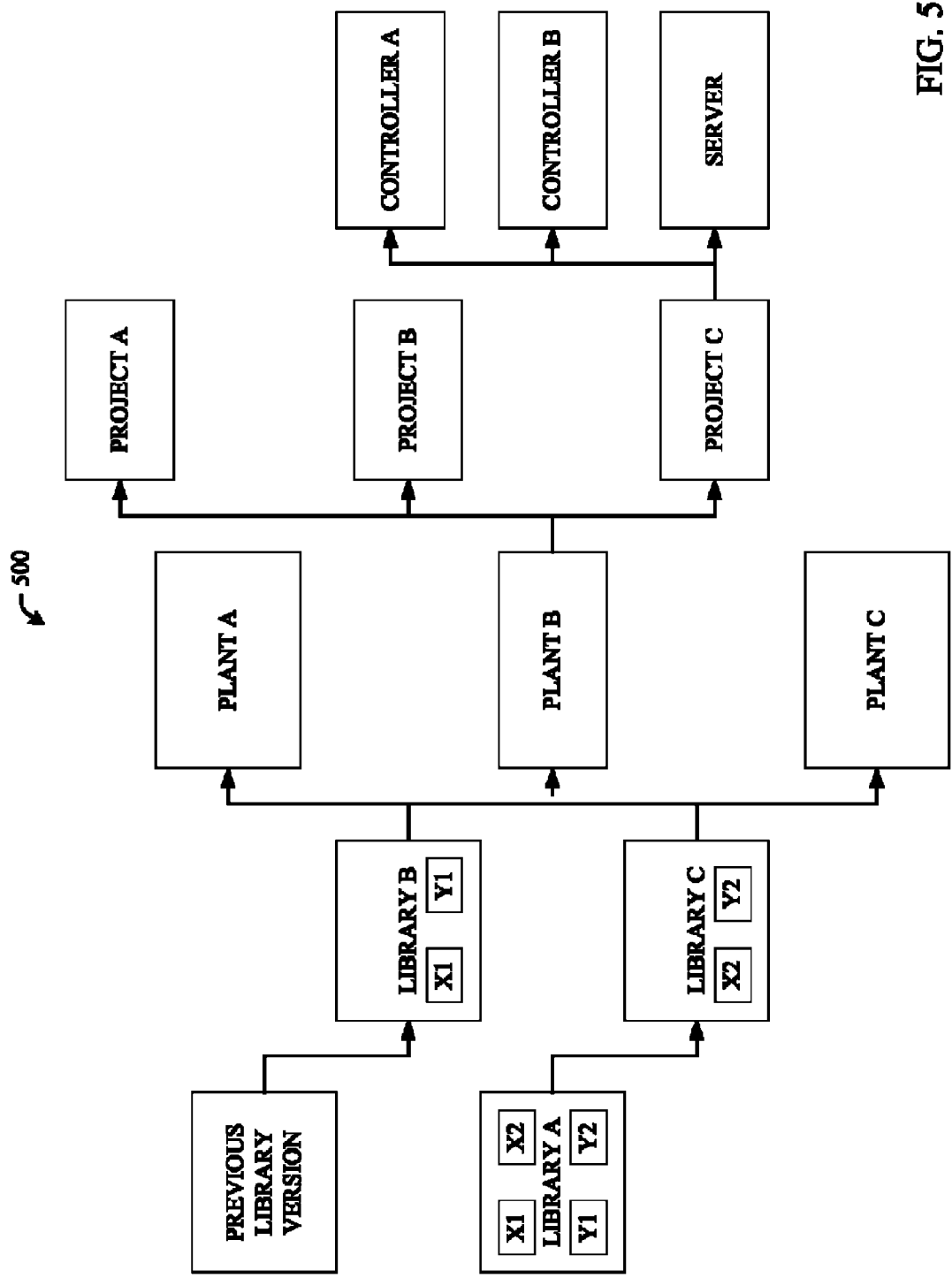
FIG. 5 illustrates a representative industrial control configuration in accordance with an aspect of the subject specification.

Now referring to FIG. 5, an example system 500 is disclosed representing a complex industrial control system. Library A and previous versions of the library can be provided through an OEM (original equipment manufacturer). Library A as well as previous versions can be used for product support. At one time, the OEM can sell a first product with Library B to a customer, where Library B is a previous version of Library A that includes definitions X1 and Y1. At a later time, the updated library can be provided to the customer represented as Library C that includes definitions X2 and Y2, updates of definitions X1 and Y1 respectively. Various security measures can be instituted, such as password protecting portions of entities, including definitions. If a vendor accesses the system 500, the security measures can protect sensitive information.

The customer can assign various definitions and instances to plants (e.g., Plant A, Plant B, and/or Plant C) that can be located at different physical locations. The plants can include individual projects (e.g., Project A, Project B, and/or Project C reside upon Plant B) where the individual projects can be reliant upon different network entities (e.g., Controller A, Controller B, and Server, which are used by Project C). Each plant, project, entity, and the like can have various instances and/or local definitions (e.g., an instance from a general definition upon which other instances on a common entity are reliant) based upon internal logic. For example, each plant, project, and entity (can be referred to as articles) can have an individual identification component 110 of FIG. 1 and/or resolution component 112 of FIG. 1. Updates of definitions can be communicated to each article and an article can use the resolution component 112 of FIG. 1 and/or the identification component 112 of FIG. 1 to recognize the change and to determine how and/or if the change should be implemented upon an instance. Thus, different articles of one industrial control system can have different definition versions.

It is possible that determining a manner in which a change to a definition should be implemented can include determining the change should not take place. For example, Plant A and Plant B can manufacture different elements of a product. Definitions in plant B can include data relevant for operation of Plant A but unnecessary in plant B. It can be a waste of resources for Plant B to continuously update the definitions to reflect changes since the definitions are not used by Plant B, so a determination can be made never to implement the update.

Figure 6:
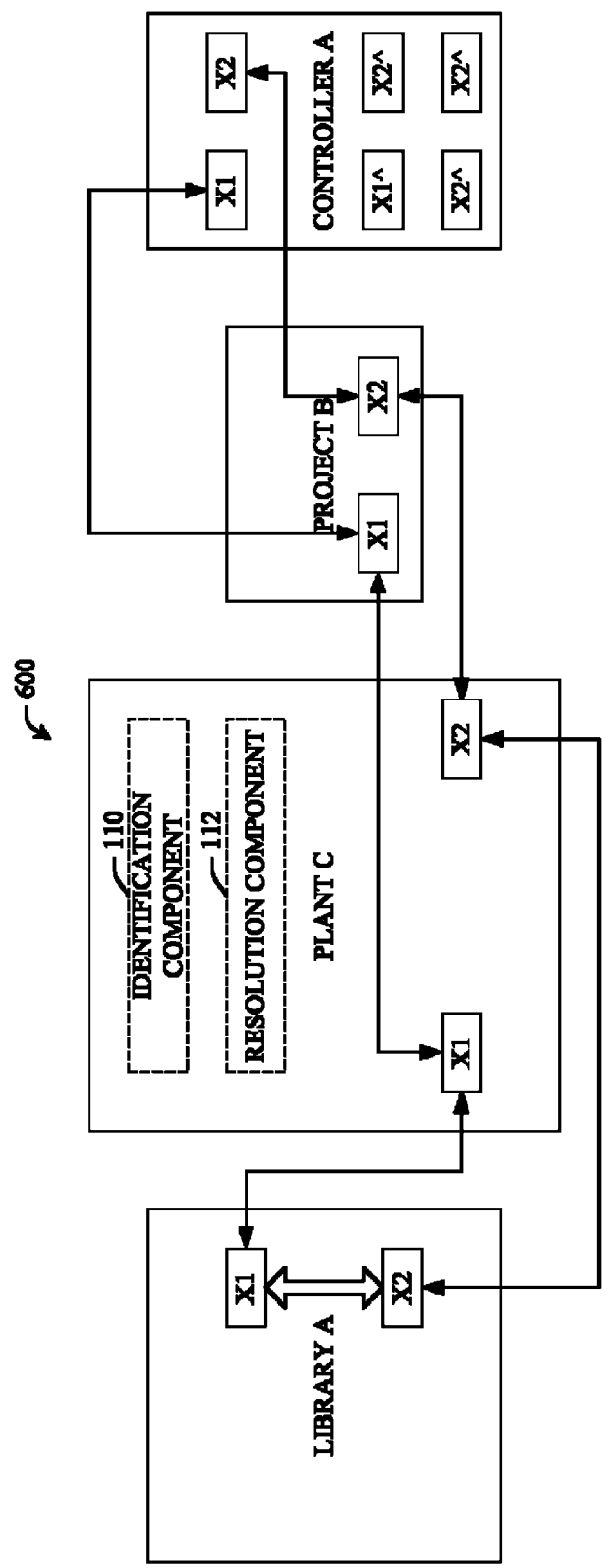
FIG. 6 illustrates a representative industrial control configuration in accordance with an aspect of the subject specification.

Now referring to FIG. 6, an example system 600 is disclosed for synchronizing at least one definition and at least one instance across an industrial control configuration. Specifically, the system 600 can represent matching named elements disclosed in the system 500 of FIG. 5. Library A can initially include a definition X1 that is populated upon Plant C, Project B (e.g., a project of Plant C), and Controller A (e.g., a controller used in operation of Project B). However, the definition X1 can be subjected to a modification such that X2 becomes a new value. A request to populate the new definition X2 can be transferred to Plant C.

Plant C can evaluate the request through use of an identification component 110 and a resolution component 112. The identification component 110 can recognize that the definition is to be changed from X1 to X2. The resolution component 112 can determine a manner for implementing the change from X1 to X2. According to one embodiment, the change is for local definitions and/or instances in Plant C. However, other configurations can be practiced, such as the identification component 110 and/or resolution component 112 operating for dependent units such as Project B and/or Controller A.

It is to be appreciated that propagation can take place from dependant units. For example, a user can make a request to change Definition X1 to Definition X2 at Controller A. The identification component 110 and resolution component 112 can be used to determine not only how instances and local definitions of the controller should change, but also how instances and/or definitions upon other units should change, including those that are 'up-stream' of Controller A, such as Project B, Plant C, or Library A.

Figure 7:
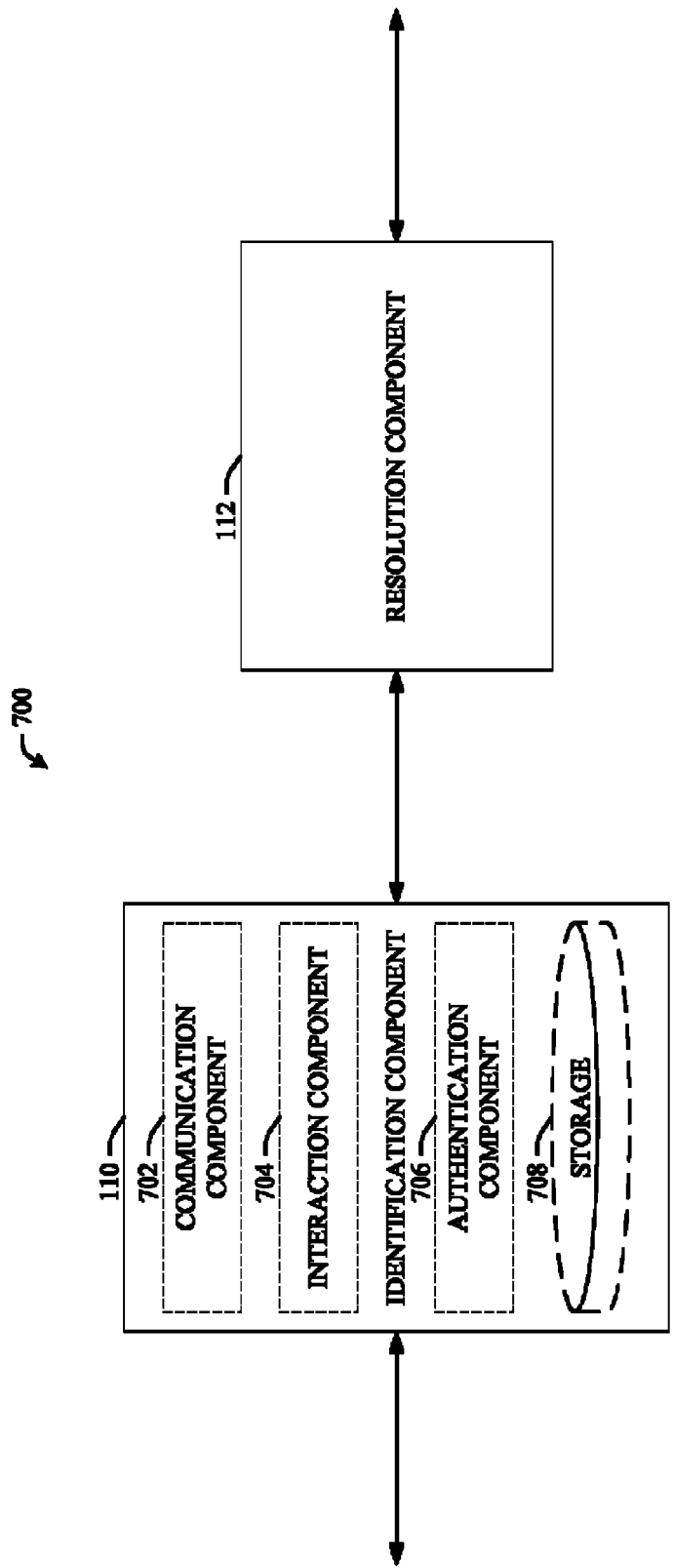
FIG. 7 illustrates a representative system that can implement upon a library with a detailed identification component in accordance with an aspect of the subject specification.

Now referring to FIG. 7, an example system 700 for determining a manner in which a change upon a definition should be propagated and/or synchronized through an at least one unit of industrial control system with an example detailed identification component 110. An identification component 110 can recognizes a change upon a definition. To facilitate operation, the identification component 110 can use a communication component 702 that can engage with other devices to transfer information, such as to send a request for metadata to determine how a change should be synchronized, receiving metadata from an auxiliary source, etc. Operation can take place wirelessly, in a hard-wired manner, employment of security technology (e.g., encryption), etc. Additionally, metadata transfer can be active (e.g., query/response) or passive (e.g., monitoring of public communication signals). Moreover, the communication component 702 can use various protective features, such as performing a virus scan on collected metadata and blocking metadata that is positive for a virus.

Oftentimes a user can make a request for a definition to change or to provide guidance on a manner in which to synchronize definitions with instances. An interaction component 704 can collect a user response to the change in the definition, the user response is employed to regulate the determination. Multiple criteria can be taken into account when determining a manner to perform the change including user instruction balanced against another standard such as against a rule set.

It is possible that request to change a definition can derive from an unauthorized source. For example, a station employee can request to change a definition that is intended to have change limited to a process management employee. Therefore, the authentication component 706 can determine if a request to change a definition and/or propagate the change upon other instances and/or definitions should be implemented, derives from an allowable entity, and the like.

Different pieces of information, such as collected metadata, component operating instructions (e.g., communication component 702), source location, components themselves, etc. can be held on storage 708. Storage 708 can arrange in a number of different configurations, including as random access memory, battery-backed memory, hard disk, magnetic tape, etc. Various features can be implemented upon storage 708, such as compression and automatic back up (e.g., use of a Redundant Array of Independent Drives configuration). In addition, storage 708 can operate as memory that can be operatively coupled to a processor (not shown). The system 700 can include a resolution component 112 that can determine a manner in which the change should be implemented.

Figure 8:
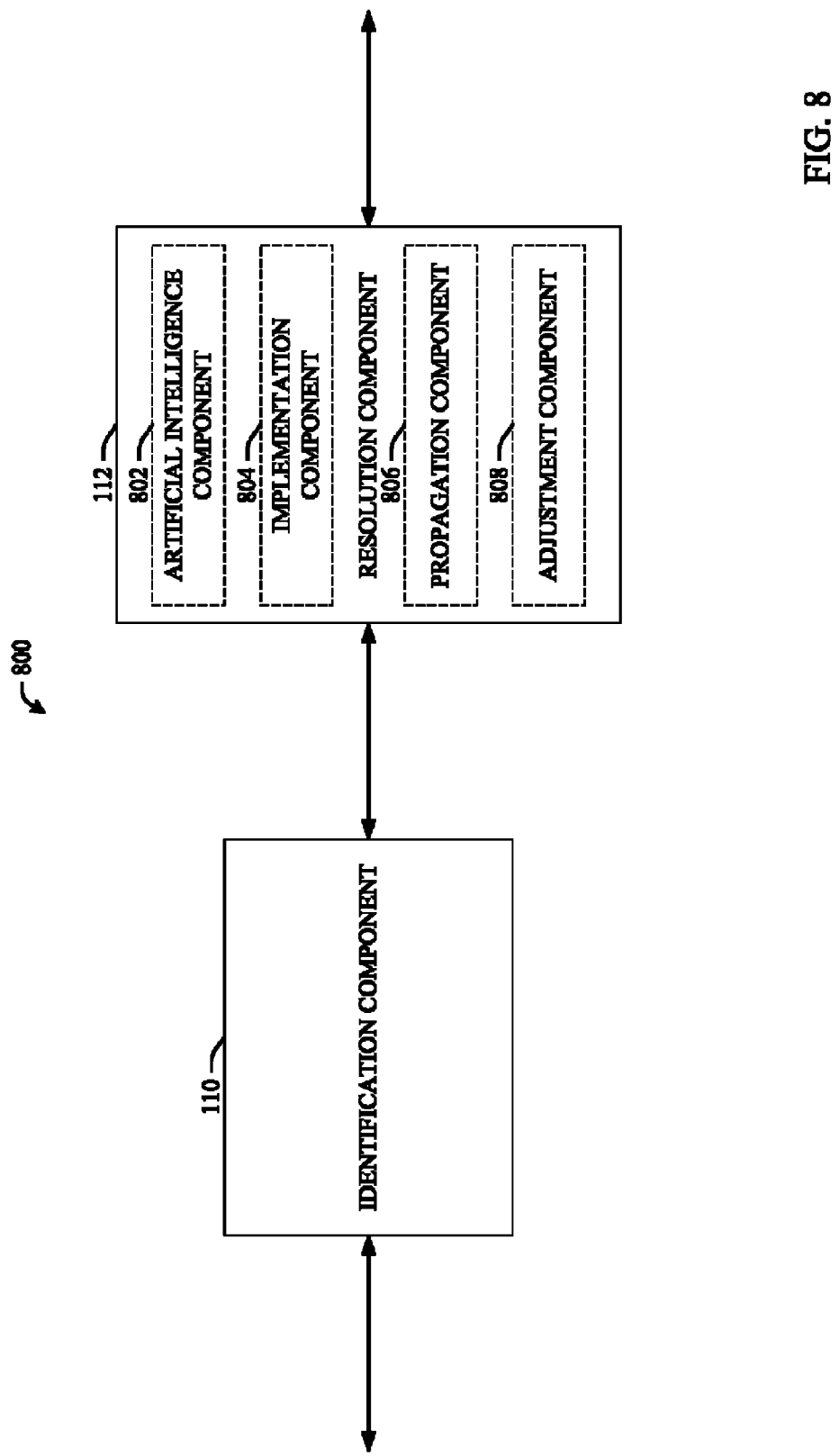
FIG. 8 illustrates a representative system that can implement upon a library with a detailed resolution component in accordance with an aspect of the subject specification.

Now referring to FIG. 8, an example system 800 for determining a manner in which a change upon a definition should be propagated and/or synchronized through an at least one unit of industrial control system with an example detailed identification component 110. An identification component 110 can recognize a change upon a definition (e.g., a proposed change, an implemented change, etc.). With the identified change, a resolution component that determines a manner in which the change should be implemented, such as updating a definition when the change is to modify a definition value or to synchronize a definition with at least one instance when the change is to propagate a definition change. According to one embodiment, the identification component 110 can create a library (e.g., library 102 of FIG. 1) for an existing code block).

An artificial intelligence component 802 can be used to determine the manner in which the change should occur and can be configurable through rules definitions. The artificial intelligence component 802 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 802 can also include methods for capture of logical relationships such as theorem provers or more heuristic rule-based expert systems and use an expert system that remembers what is learned and is used to make decisions on learned knowledge. The artificial intelligence component 802 can be represented as an externally pluggable component, in some cases designed by a disparate (third) party.

An implementation component 804 can implement the change in accordance with the determination. According to one embodiment, the manner in which the change should be implemented is if implementation should occur about immediately or after experiencing a delay (e.g., an estimated delay, instructed by a user, and the like). The delay can be time-based, state-based (e.g., wait until the production line is idled for maintenance), event-based (e.g., wait until the current production run is finished), user command based (e.g., all changes wait until user approves), delay ends based on at least one artificial intelligence rule, etc. Once implementation occurs, a verification check can be performed by the implementation component 804 to determine if implementation is successful. If implementation is determined not to be successful, then the implementation component 804 can re-attempt to implement, determine why there was not success, attempt to repair an identified problem, create a diagnostic report concerning a problem, and the like.

The resolution component 112 can operate in multiple aspects—a manner can be determined for changing a definition, for changing a local instance, chancing a remote instance, and the like. The resolution component 112 can use a propagation component 804 that concludes an approach in which the change should be synchronized about at least one instance reliant upon the definition. The conclusion can be made based upon artificial intelligence techniques, user preference, a defined rule set, user instruction, or a combination thereof, as well as through other standards. According to one embodiment, the definition is a general definition (applicable to more than one entity) that resides in a library (e.g., library 102 of FIG. 1). Thus, at least one instance subject to synchronization can reside in the library and/or a unit reliant upon the library. The definition can also be a local definition that resides in a unit reliant upon a library.

An adjustment component 808 can modify how the determination is made based upon at least one observation or instruction. For example, the adjustment component 808 can observe if errors occur when a rule set is relied upon for making a determination on a manner for implementation. If there is an error, then the adjustment component 808 can change at least a portion of the rule set in order to prevent other errors during other synchronizations. In addition, a user, an entity, and the like can make an explicit instruction to change the rule set, such as a user requesting the rule set be re-ordered and the adjustment component 808 can evaluate the request and implement the request if appropriate.

Figure 9:
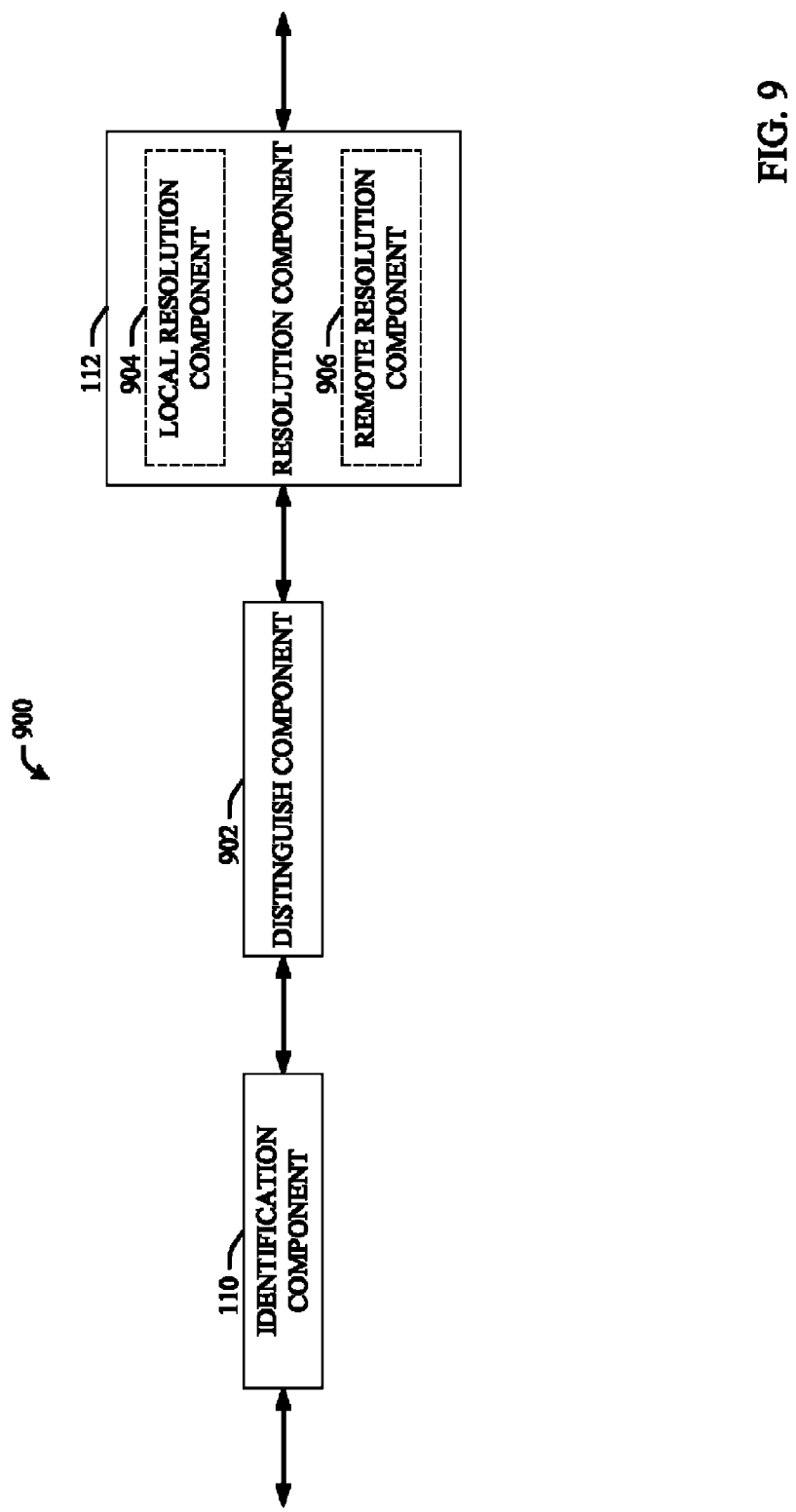
FIG. 9 illustrates a representative system for updating information in regard to an industrial control configuration in accordance with an aspect of the subject specification.

Now referring to FIG. 9, an example system 900 is disclosed for synchronizing a change upon a definition to various instances (e.g., local definitions that also function as instances of a general definition, pure instance—instance that do not have dependant instances, etc.) of an industrial control system. An identification component 110 can recognize a change upon a definition. The identification component 110 can operate as means for identifying a change upon a definition (e.g., implemented change, proposed change, and the like).

A distinguish component 902 can be used to identify at least one local instance (e.g., instance that is part of a common module of at least one definition) and/or at least one remote instance (e.g., instance that is not part of a common module of at least one definition) of the changed definition. Various manners can be used to identify instances. For example, each time an instance is created and/or deleted, a log can be modified to indicate information concerning the instance. Additionally, metadata can be logged that relates to an instance, such as a current version, a party that instructs a change, time of previous changes, and the like. Additionally, the distinguish component 902 can perform a search upon an industrial control system to determine instances of a definition. The distinguish component 902 can operate as means for distinguishing at least one local instance of the definition or at least one remote instance of the definition.

With identified instances, a resolution component 112 can determine a manner in which to modify the instances in accordance with a change upon the definition. The resolution component can use a local resolution component 904 that functions upon local instances and a remote resolution component 906 that functions upon remote instances.

The local resolution component 904 can implement as means for determining if at least one local instance of the definition should be automatically propagated with the change if at least one local instance is recognized. The remote resolution component 906 can function as means for determining if at least one remote instance of the definition should be automatically propagated with the change if at least one remote instance is recognized. Additionally, means for determining if at least one local instance of the definition should be automatically propagated with the change if at least one local instance is recognized can use artificial intelligence techniques, user preference, a defined rule set, user instruction, or a combination thereof in making at least one determination. Additionally, means for determining if at least one remote instance of the definition should be automatically propagated with the change if at least one remote instance is recognized can use artificial intelligence techniques, user preference, a defined rule set, user instruction, or a combination thereof in making at least one determination.

Figure 10:
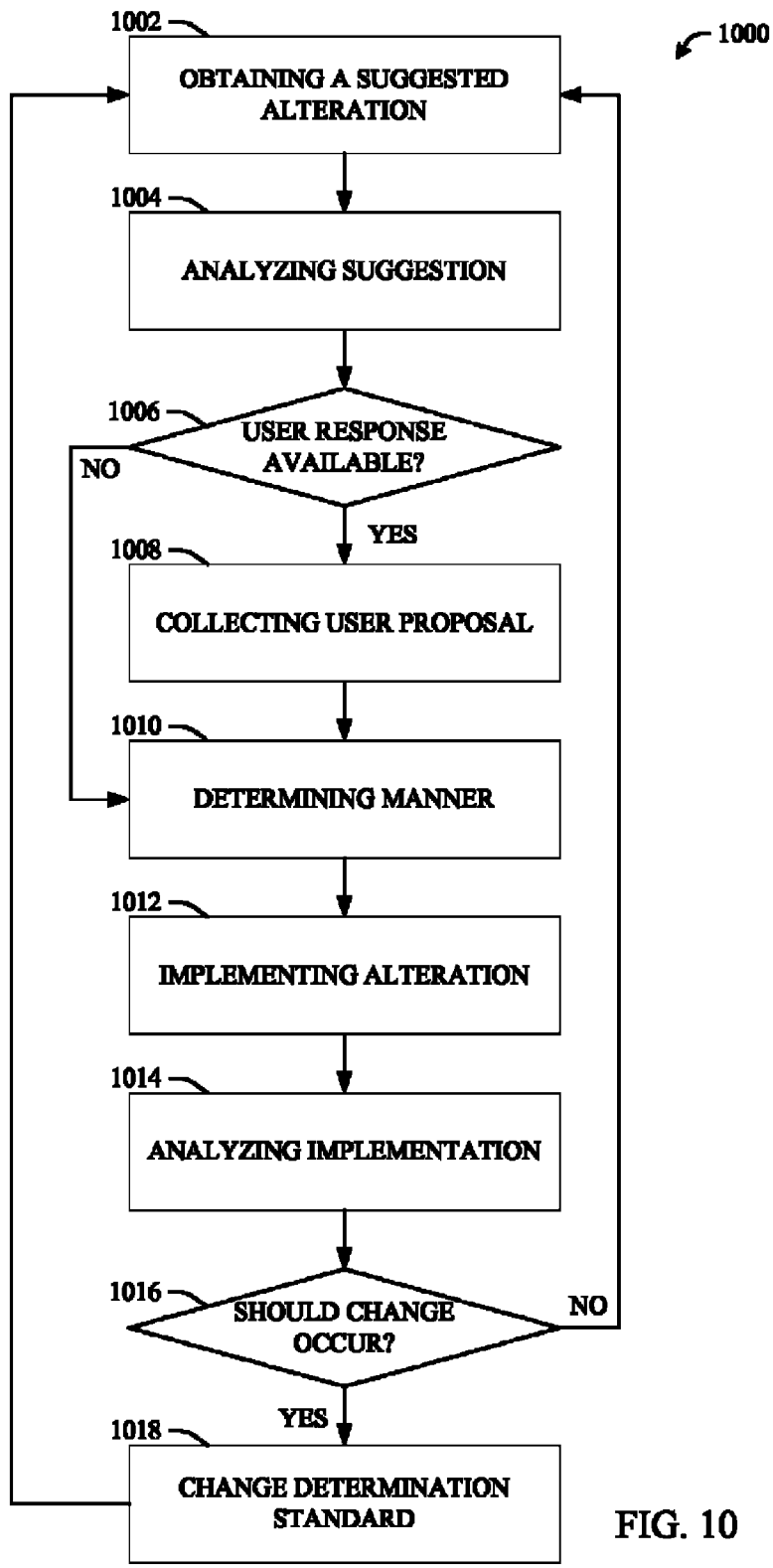
FIG. 10 illustrates a representative methodology for changing instances based upon definition in accordance with an aspect of the subject specification.

Now referring to FIG. 10, an example methodology 1000 is disclosed for facilitating a change upon an instance or definition in an industrial control configuration. A requested alteration for a definition or an instance can be obtained through action 1002. The suggestion can be analyzed at event 1004. Metadata related to the suggested alteration can also be collected as a result of the analysis, such as a name of an entity that makes a request. The suggestion can be to modify a definition as well as to synchronize an instance with a changed definition.

A check 1006 can occur to determine if a user response to a suggested change can be gathered. Commonly, the user response is taken into account when determining when and/or how a change should be propagated. If the user response is available, then a user can be solicited and the user can provide a proposal on how the change should be implemented at event 1008. For example, a user can propose that the change be implemented when a set of diagnostic tests are completed.

With or without a user proposal, a manner in which change should be implemented can be determined through act 1010. Act 1010 can function as determining a manner in which a suggested alteration to a definition should be implemented. The specific manner chosen, a slight variation based upon changing characteristics, and the like can be implemented through action 1012. Action 1012 can operate as implementing the alteration in accordance with the determination.

The definition can be a general definition retained in a library, a local definition that resides in a unit reliant in a library, as well as other configurations. Artificial intelligence techniques as well as a rule set can be used to determine how implementation should occur (e.g., synchronization). However, the outcome could not be desirable, such as synchronization takes too long. Therefore, a result of the implementation can be analyzed for determination if modification of how a determination is made on the manner is appropriate at action 1014. A check 1016 can determine if a change is appropriate—if a change is not appropriate, then the methodology 1000 can return to action 1002 to collect another suggested alteration. However, if a change should occur, then a proper modification can be identified and the determination can be changed in accordance with the identified modification at event 1018.

Figure 11:
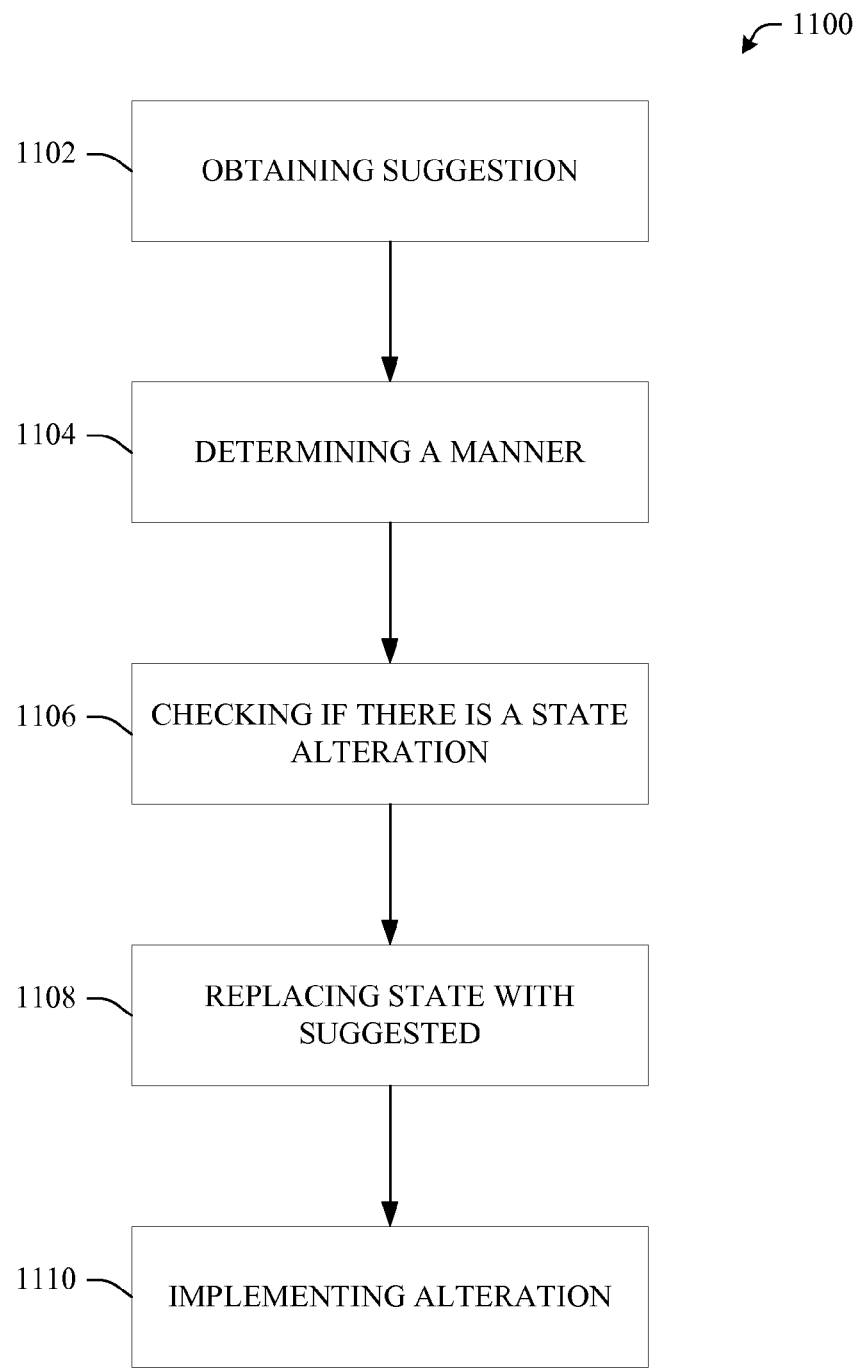
FIG. 11 illustrates a representative methodology for changing updates in waiting in accordance with an aspect of the subject specification.

Now referring to FIG. 11, an example methodology 1100 is disclosed for updating a modification to a definition or an instance that is in waiting. A suggestion to modify a definition or an instance can be obtained through action 1102. The suggestion can arise for a user as well as from an automatically operating unit. A manner in which to implement the suggestion can be determined at act 1104. Thus act 1104 can function as determining a manner in which a suggested alteration to a definition should be implemented.

A check can be performed at event 1106 if there are multiple alterations in waiting. For example, a first update can be transferred and an instruction can be made that synchronization should wait one hour. However, a second update can be suggested about a half hour later, thus there are two waiting updates. Event 1106 can operate as checking if there is a stale alteration in waiting. At block 1108 the second update can related the first update in order to conserve configuration resources. Block 1108 can operate as replacing a stale alteration with the suggested alteration. The alteration can be implemented through action 1110 in accordance with the determination at act 1104, thus this can utilize the second update.

It is possible for multiple updates to be in waiting for a particular instance. Additionally, logic can be used to determine an appropriate synchronization when conflicting updates arise. For example, simultaneous updates can originate from different sources—artificial intelligence techniques can be used to determine which update should be synchronized in the system.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 12:
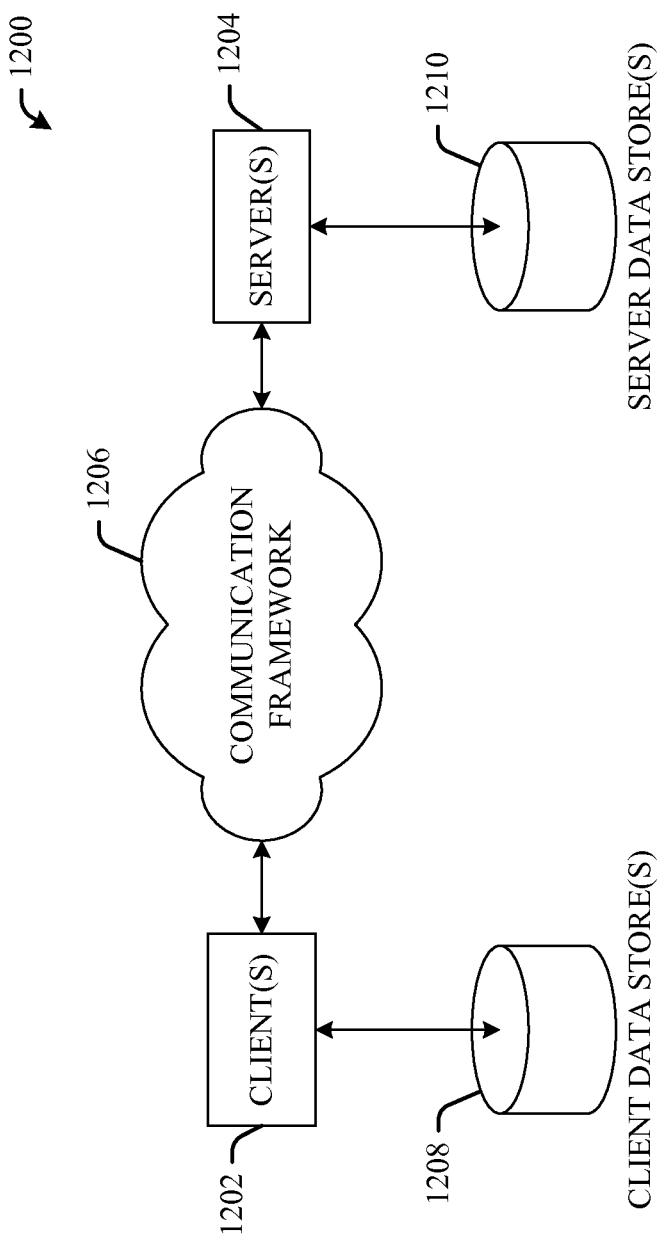
FIG. 12 illustrates an example of a schematic block diagram of a computing environment in accordance with an aspect subject specification.
Figure 13:
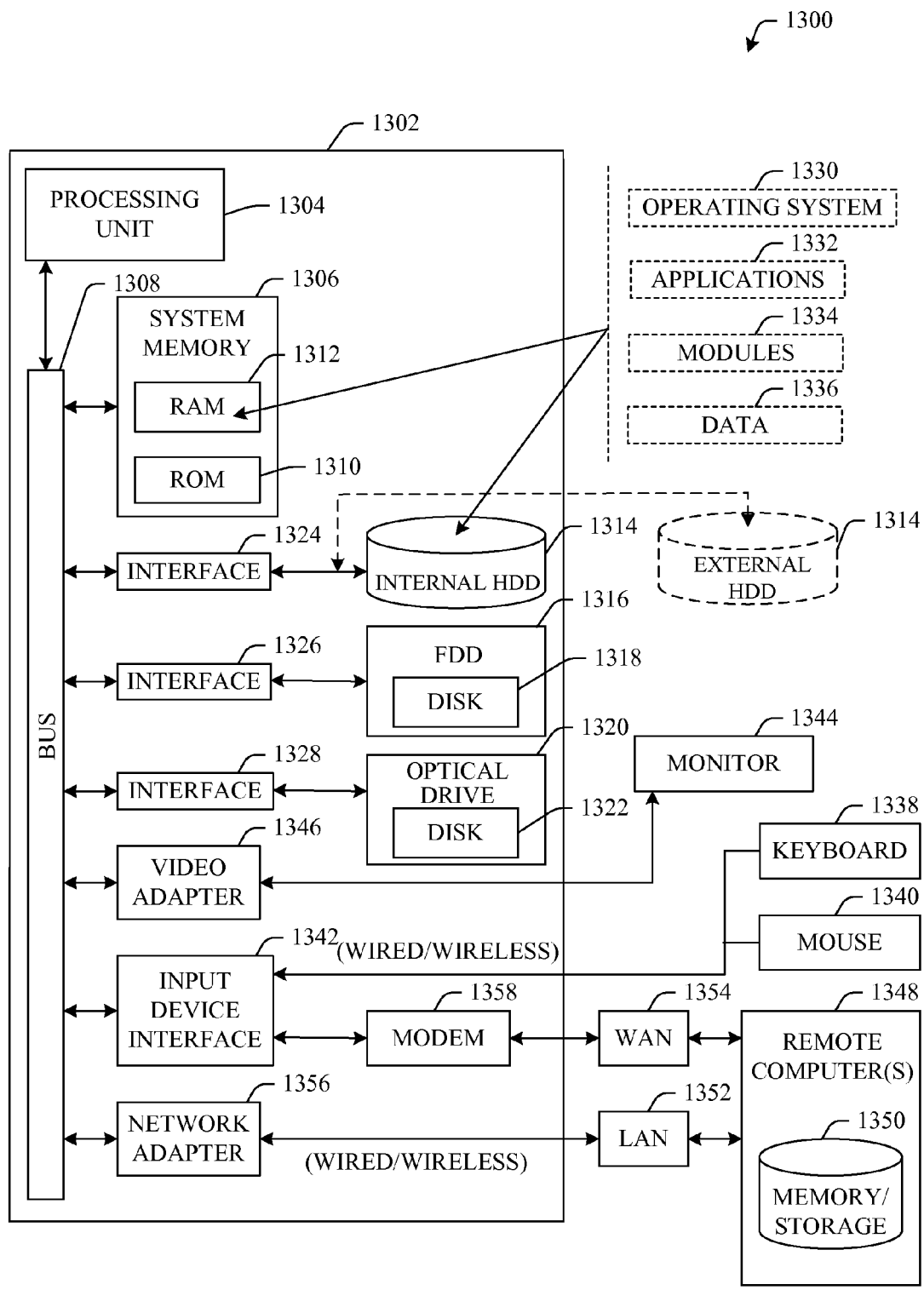
FIG. 13 illustrates an example of a block diagram of a computer operable to execute the disclosed architecture.

In order to provide a context for the various aspects of the disclosed subject matter, FIGS. 12 and 13 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 12, there is illustrated a schematic block diagram of a computing environment 1200 in accordance with the subject specification. The system 1200 includes one or more client(s) 1202. The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., associated contextual information). Similarly, the server(s) 1204 are operatively connected to one or more server data store(s) 1210 that can be employed to store information local to the servers 1204.

Referring now to FIG. 13, there is illustrated a block diagram of a computer operable to execute the disclosed architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors or proprietary specific configured processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA, SCSI, RAID), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314 can also be solid state. The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various proprietary or commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the input device interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, as well as 802.11n standard, for example, or with products that contain both bands (dual band), so the networks can provide real-world performance similar to the basic 10BaseT wired Ethernet networks used in many offices. In addition, wireless networks can be configured as secured and unsecured, using various protocols, such as: Shared, Open, WEP, WPA, 802.1X, CCKM, etc. It is to be apprieciated that other standards can be used and capabilities can be increased. For instance, protocol extending to 108 MBS, 200 MBS, etc.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    identifying, by a system including a processor, a change to a definition, wherein the definition comprises logical program code executable on one or more industrial automation control devices; and
    determining, by the system, according to a rule set, a manner in which to propagate the change to one or more instances of the definition on the one or more industrial automation control devices, wherein the rule set directs the system to propagate the change to local instances of the one or more instances of the definition installed locally to the system, and to not propagate the change to remote instances of the one or more instances of the definition installed remotely from the system.

2. The method of claim 1, wherein the rule set directs the system with a timeframe at which to propagate the change to the one or more instances of the definition.

3. The method of claim 2, wherein the timeframe is a delay.

4. The method of claim 3, wherein the delay is based upon waiting for a particular production state to occur in a manufacturing operation associated with the one or more industrial automation control devices.

5. The method of claim 3, wherein the delay is based upon waiting for an upcoming production event to occur associated with in a manufacturing operation associated with the one or more industrial automation control devices.

6. The method of claim 3, wherein the delay is based upon waiting for input from a user.

7. The method of claim 2, wherein the timeframe for a first subset of the one or more instances of the definition is a first timeframe, and the timeframe for a second subset of the one or more instances of the definition is a second timeframe, the first timeframe is different than the second timeframe.

8. The method of claim 4, wherein the production state is idled for maintenance.

9. A non-transitory computer-readable medium having instructions stored thereon that, in response to execution, cause a system including a processor to perform operations comprising:
    identifying a change to a definition, wherein the definition comprises logical program code executable on one or more industrial automation control devices; and
    determining, based upon a rules set, a manner in which to propagate the change to one or more instances of the definition on the one or more industrial automation control devices, wherein the rule set instructs the system to propagate the change to local instances of the one or more instances of the definition installed locally to the system, and to not propagate the change to remote instances of the one or more instances of the definition installed remotely from the system.

10. The non-transitory computer-readable medium of claim 9, wherein the rule set instructs the system with a timeframe at which to propagate the change to the one or more instances of the definition.

11. The non-transitory computer-readable medium of claim 10, wherein the timeframe is a delay.

12. The non-transitory computer-readable medium of claim 11, wherein the delay is based upon waiting for a particular manufacturing state to occur in a manufacturing operation associated with the one or more industrial automation control devices.

13. The non-transitory computer-readable medium of claim 11, wherein the delay is based upon waiting for an upcoming manufacturing event to occur associated with in a manufacturing operation associated with the one or more industrial automation control devices.

14. The non-transitory computer-readable medium of claim 11, wherein the delay is based upon waiting for input from a user.

15. The non-transitory computer-readable medium of claim 10, wherein the timeframe for a first subset of the one or more instances of the definition is a first timeframe, and the timeframe for a second subset of the one or more instances of the definition is a second timeframe, the first timeframe is different than the second timeframe.

16. The non-transitory computer-readable medium of claim 9, wherein the manufacturing state is idled for maintenance.

17. A system, comprising:
    a processor;
    a memory communicatively coupled to the processor, the memory having stored therein computer-executable instructions, comprising:
        an identification component configured to identify a change to a definition, wherein the definition comprises logical program code executable on one or more industrial automation control devices; and
        a resolution component configured to determine, based upon a rule set, a manner in which to propagate the change to one or more instances of the definition on the one or more industrial automation control devices, wherein the rule set instructs the system to propagate the change to local instances of the one or more instances of the definition installed locally to the system, and to not propagate the change to remote instances of the one or more instances of the definition installed remotely from the system.

18. The system of claim 17, wherein the rule set defines a instructs the system with timeframe at which to propagate the change to the one or more instances of the definition.

19. The system of claim 18, wherein the timeframe is a delay based upon waiting for a particular operational state to occur of a production line in which the one or more instances of the definition is employed.

20. The system of claim 19, wherein the operational state is idled for maintenance.

* * * * *